United States Patent Office 3,810,814
Patented May 14, 1974

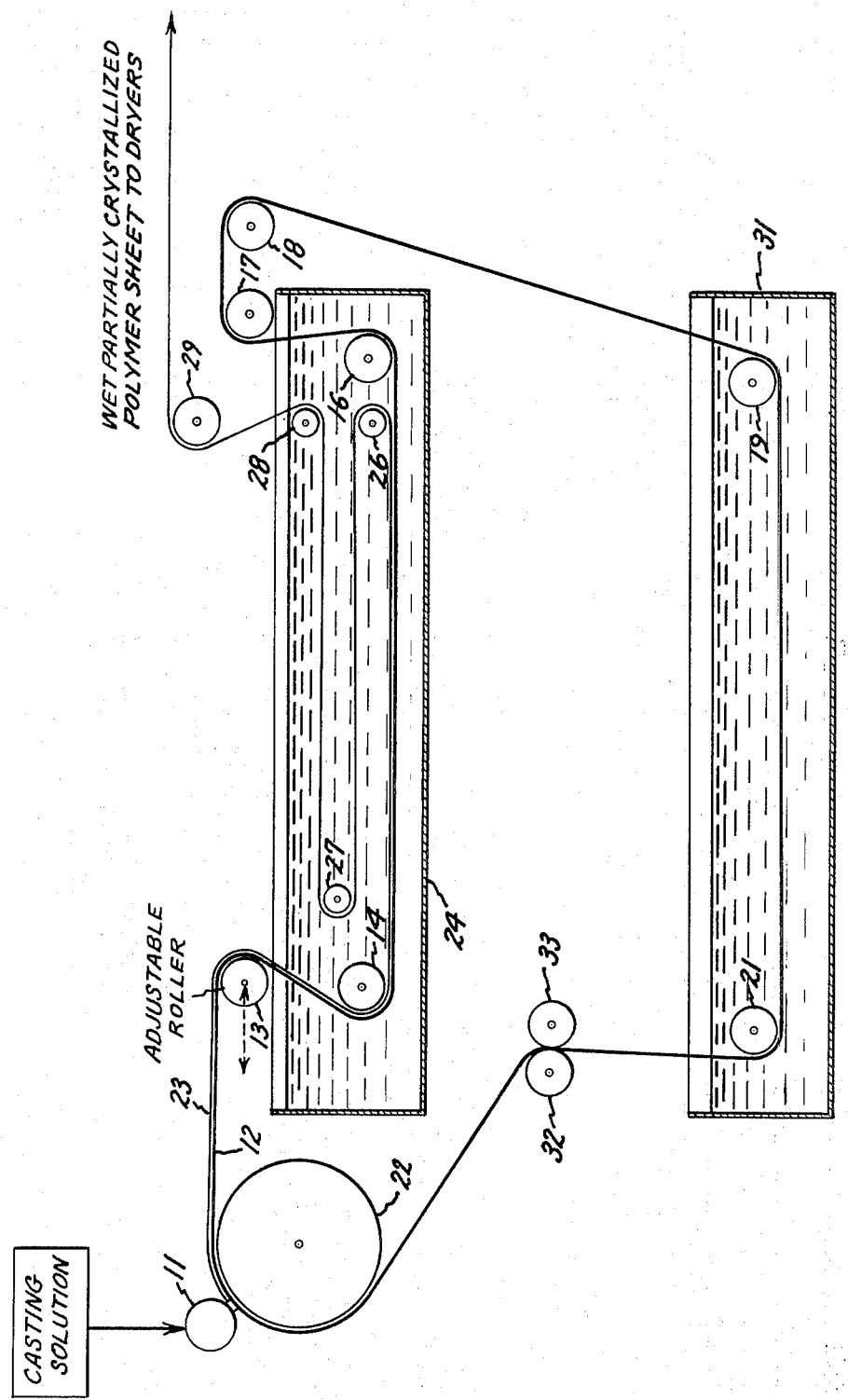

3,810,814
ASYMMETRIC POLYMER MEMBRANES OF REDUCED ELASTIC MODULUS
Carlyle S. Herrick, Alplaus, and Allan R. Shultz, Scotia, N.Y., assignors to General Electric Company
Filed Dec. 18, 1972, Ser. No. 315,801
Int. Cl. B32b 5/18
U.S. Cl. 161—159
5 Claims

ABSTRACT OF THE DISCLOSURE

An improved method is disclosed for the manufacture of dry asymmetric membranes, which comprise a porous layer of interconnected crystals of polymer material and, integral therewith, a dense less crystalline surface layer forming one face of the membrane. Finely divided grafted elastomeric material compatible with the system is included in the casting solution and the completed membrane embodies the tiny elastomeric particles apparently uniformly distributed therethrough. The use of elastomeric particles having polystyrene chains grafted thereto is specifically described as being added for preparing asymmetric polyxylylene oxide membranes.

BACKGROUND OF THE INVENTION

A method for the preparation of asymmetric membranes from various polymers is described in U.S. patent application Ser. No. 36,923—Kimura, filed May 13, 1970 now U.S. Pat. 3,709,774, and assigned to the assignee of the instant invention. The Kimura application is incorporated by reference. Detailed description is given therein of the structure of polyxylylene oxide membranes prepared by this method and include membranes having a graded porosity and an interconnected pore system progressing from a dense, thin (about 1–2 micrometers thick) surface layer to the opposite face thereof.

Manufacture of asymmetric polyxylylene oxide membranes by the process described in the Kimura application has been, and continues to be, satisfactory so long as the membranes are not subjected to folding or creasing during the manufacturing process and packaging operations. Ordinarily, once such membranes have been packaged they will not be subjected to folding or creasing during use. It would be desirable to remove this limitation and to be able to produce asymmetric membranes having significant tolerance for folding and crease formation.

SUMMARY OF THE INVENTION

It has been discovered that by adding to the casting solution (of the Kimura invention) for preparing a polymeric asymmetric membrane a small quantity of colloidal-sized (0.1–10 micrometers) elastomeric particles rendered compatible with the polymer material and casting a membrane the requisite crystallization phenomena proceed uninhibited and an asymmetric membrane is still produced. Such asymmetric membranes having a non-porous surface layer are found to possess significantly increased crack resistance, increased tear strength and increased separation capability. Elastomeric particles averaging approximately 5 micrometers in diameter having polystyrene chains grafted thereto have been successfully and beneficially incorporated in asymmetric polyxylylene oxide membranes.

BRIEF DESCRIPTION OF THE DRAWING

Objects and advantages of this invention will be apparent to those skilled in the art from consideration of the description taken in connection with the accompanying drawing schematically representing apparatus for the conversion of a polymer coating solution to a continuous sheet of solid polymer having an asymmetric structure.

DESCRIPTION OF THE PREFERRED EMBODIMENT

Two types of asymmetric polymer membrane structures are produced by the method described in the aforementioned Kimura application, both having graded porosity in the form of interconnected pores. In the first type of asymmetric membrane the interconnected pores range from an effective diameter of about 100 A. at one membrane face to a smaller undetermined size adjacent a dense non-porous layer forming the second face of the membrane. In the second type of asymmetric membrane the interconnected pores range from an effective diameter of about 100 A. at one membrane face to some very small finite value at the opposite face of the membrane whereby gas can freely pass through the membrane. In both cases the regions of graded porosity are microporous.

Among the thermoplastic polymer materials from which asymmetric membranes may be prepared are the arylene oxide polymers described in U.S. Pat. No. 3,350,844—Robb (incorporated by reference), polycarbonate resins such as are described in U.S. Pat. No. 3,256,675—Robb et al. (incorporated by reference), polyvinyl acetate resins, polyalkyl methacrylate resins, polysulfones, polymers of monovinyl aromatic hydrocarbons, etc.

According to the method in the Kimura application, once the crystalline polymer from which the membrane is to be prepared has been selected, the solvent system to be employed in preparing the casting solution may be determined in routine fashion. First, a volatile (boiling point of about 50° C.) solvent able to dissolve at least 15% by weight of the polymer is selected, if available. If such a "good" solvent is not available, a solvent having characteristics of solubility and volatility as close thereto as possible is selected. Next (as related to this "good" volatile solvent), a poorer solvent for the same polymer, which is (a) less volatile than the good solvent by a factor of at least about 2, and (b) is miscible with the good volatile solvent (i.e. the solvents are mutually dispersible on a molecular scale), is selected in order that a casting solution may be prepared containing these three components; namely, the polymer material, the good volatile solvent, and the poorer non-volatile solvent. The quantity of poorer solvent should range from about 10 to about 50% by volume of the good solvent/polymer solution.

The characterization of the aforementioned solvents as "good" and "poorer" reflects the difference in the capability thereof to dissolve the selected polymer, thus the good solvent should be able to dissolve from about 2 to about 10 times the amount of polymer as will dissolve in the poorer solvent. Another measure of "good" and "poorer" can be obtained from a measure of the intrinsic viscosity of the polymer in the given solvent.

A similar routine method of selection is employed in determining the liquid leaching agent to be used. This material must (a) be miscible with both the good solvent and the poorer solvent, but (b) be a nonsolvent for the selected polymer material.

Having prepared the aforementioned casting solution a membrane is cast upon a flat surface (e.g. a glass plate) in a thickness in the range of from about 5 to about 25 mils. The cast membrane is allowed to desolvate for some preselected time and, thereafter, the membrane and supporting surface are immersed in a bath of the leaching agent. The period of immersion should be long enough for the proper crystalline structure to develop and define the interconnected microporous pore system providing the desired graded porosity. After the immersion, the membrane is dried.

As long as asymmetric membranes produced by the above-described method are not subjected to folding or creasing, this method is a satisfactory one. If creases occur, there is a marked tendency to generate cracks through the thin, dense layer. Such breaches cannot be tolerated in gas separation membranes. Therefore, attempts have been made to change the process in order to relax the requirement for maintaining flatness of the membrane during manufacture and later processing, e.g. packaging. It was finally concluded that attempts should be made to produce asymmetric PPO membranes of greater elasticity (reduced elastic modulus) and, therefore, of reduced tendency to form cracks.

Changes were tried in the crystallizing (leaching) bath and various combinations of PPO of different intrinsic viscosities were employed to provide various molecular weight distributions. None of these changes provide film free of the propensity to crack generation upon creasing.

Casting solutions of polyxylylene oxide (PPO) were made up in which casting solutions prepared as described above (Kimura) were modified by additions as follows:

(a) Kimura solution plus 600 molecular weight polystyrene in various concentrations;
(b) Kimura solution plus a plasticizer (chlorinated aromatic hydrocarbons) in various concentrations; and
(c) Kimura solution plus a co-polymer of butadiene and styrene each chain of which consists of a segment of polybutadiene (molecular weight of 50,000) between two segments of polystyrene (molecular weight of 15,000).

Each of these modifications produced membranes, which were poorer than those produced from using the Kimura solution or, at best, did not cure the problem. It was found that polystyrene additions had harmful effects (lowering of the glass transition temperature and increasing the brittleness of the PPO).

Cizek—U.S. 3,383,435 (incorporated by reference) describes the preparation of various blends of polyphenylene ether (polyxylylene oxide) and styrene resin to improve the moldability of the PPO. Among the styrene resins employed are polystyrene, styrene-butadiene copolymers and rubber modified polystyrene (HIPS). The preparation of regular (non-asymmetric) films from these materials is referred to in Cizek. However, the preparation of asymmetric membranes poses unique problems in crystallization of the PPO and no indication is given in the patent that any PPO-polystyrene combination casting solution can be used to cast asymmetric membranes. Actually, as noted above, polystyrene has deleterious effects and butadiene/styrene copolymer does not produce an improved asymmetric membrane.

The addition of HIPS is a convenient way to introduce grafted elastomeric particles. However, a significant and determinable amount of the HIPS addition as commercially available is non-grafted polystyrene. This amount of non-grafted polystyrene may run as high as 50% by volume. This non-grafted polystyrene portion is, as has been stated above, deleterious to the PPO asymmetric membrane and, thus, it would appear that HIPS would not be useful as an additive. However, it was found upon experimentation that the benefits achieved by the presence of the grafted elastomeric particles were so great that the unfavorable aspects of the presence of non-grafted polystyrene were overcome.

Further, it was not expected that the use of HIPS would even result in an asymmetric membrane, because the presence of the HIPS could be expected to inhibit the formation of the PPO crystals into the asymmetric configuration.

Also, the comparatively large volume occupied by each HIPS grafted rubber particle (the volume of each rubber center and the volume of the polystyrene chains projecting from the surface thereof) was expected to interfere with the requisite re-ordering of the long chains of PPO during crystallization. In addition to the volume aspect, each grafted rubber particle of HIPS is colloidal, when added, and the unanchored end of each polystyrene chain dissolves in the PPO. These dissolved portions of the polystyrene chains, because of the compatibility thereof with the PPO would be expected to interfere with the PPO (e.g. crystallization rate and the graded crystal size) crystallization required.

Each HIPS grafted rubber particle has an effective size ranging from about 1–10 microns, while the dense layer of the asymmetric membrane is in the 1–2 micron range. It was logical to assume that the problem of cracking involves this thin dense layer and solution to the problem would involve modification thereof. Manifestly, HIPS grafted rubber particles could not be accommodated within this thin layer either from volume considerations or from gas separation considerations (e.g. short-circuiting of the dense layer by the gases passing through the much less selective rubber portion).

In spite of all these reasons apparently predicting failure it has been found that the presence of HIPS not only can be tolerated both in the PPO crystallization and in the completed asymmetric PPO membrane, but the presence of HIPS in the system in some unknown manner actually improves the integrity of the thin, dense layer, improves the gas separation factor thereof and improves the flexibility and tear strength of the whole membrane.

Thus, in general the method of this invention is the same as in the Kimura application except for the preparation of the casting solution. In accordance with this invention an additional component is required for the casting solution. This added component consists of particles of grafted elastomeric material ranging in size from about 0.1–10 microns and this material is to be selected in accordance with the following criteria:

(1) The grafting polymer is to be compatible with the film polymer (they may be the same polymer) forming a single phase therewith, in the thermodynamic sense;
(2) The elastomer is to be one to particles of which the grafting polymer can be chemically attached through covalent bonds;
(3) The elastomer is also to be in a state that it will not dissolve in the solvent system or in the leaching agent;
(4) The graft polymer must have a high enough molecular weight (chain length) to provide for strong mechanical attachment to the film polymer; and
(5) The size of the elastomeric particles must be large enough to provide effective stress concentration.

The useable range for the grafted elastomeric particulate material is from about 1 to about 25 weight percent of the membrane polymer employed and the preferred range is from about 2 to about 15 weight percent of the membrane polymer.

Having selected the polymer, the solvent system, the leaching agent and the modified elastomeric particulate material, the procedure for the preparation of the asymmetric microporous membrane is as follows: at least about 10% by weight of polymer is dissolved in the good, volatile solvent. A solution is then prepared consisting of about 1 to 9 parts of the polymer solution to 1 part of the poorer, less-volatile solvent. A quantity of the modified elastomeric material ranging from about 1 to about 25 percent by weight of the weight of film polymer is added to the solvent in the form of a colloid.

As is shown in the drawing this liquid coating solution is applied via coating head 11 as a layer on the moving endless belt 12 extending over rollers 13, 14, 16, 17, 18, 19, 21 and coating drum 22. The thickness of the layer will be uniform and will range from about 5 to 25 mils in thickness. Belt 12 will transport the deposited layer horizontally for a period equal to the desired desolvation time. As the belt 12 carrying layer 23 for coating solution passes from roller 13 to roller 14 the belt and coating 23 become immersed in liquid leaching agent held in container 24. Roller 14 is actually two spaced rollers that engage only the edges of belt 12 which are not covered with coating 23. This immersion causes the solidification of any liquid remaining in layer 23 resulting in the formation of mono-crystalline solid particles bound together by some mechanism with gaps between the particles being interconnected in a network. The surface of the layer away from belt 12 becomes a thin dense layer and the size of the solid particles formed varies progressively from a very small size merging with the solid layer to significantly larger size at the opposite surface.

At some point in tank 24, the wet solidified layer is separated from endless belt 12 via roller 26. The solidified swollen coating 23, now unsupported and exposed on both faces to the leaching action of the liquid leaching agent is conducted through this body of liquid over rollers 27 and 28 through a sufficiently long path of travel so that the solvent content of the solidified layer or membrane 23 is reduced to a low level and until the internal stresses generated by solidification and solvent removal have been substantially relaxed.

The wet, partially crystallized polymer sheet 23 is removed from tank 24 and is advanced to the dryers (not shown) via roller 29. Belt 12 meanwhile will have been removed from container 24 for passage through a reconditioning process via rollers 17 and 18.

Reconditioning of the endless belt 12 consists of washing thereof in wash tank 31 in order to remove any liquids or solvents retained thereby before passage of belt 12 through a dryer (e.g. belt-drying rollers 32, 33 for return to coating drum 22.

The casting and leaching may be conducted at room temperature (i.e. 23° C.).

Endless belt 12 may be any flexible surface, which resists the solvents and maintains a smooth surface. Belts made of stainless steel may be employed, for example. Water may be employed in tank 31. Although a pair of drying rollers 32, 33 have been indicated for the removal of washing medium from belt 12 as it leaves wash tank 31, other methods of drying (e.g. air knife, heat, etc.) may be employed.

By exercising care to remove most of the casting solvent from layer 23 by leaching the solvent into the crystallizing liquid and selecting a crystallizing liquid that swells the polymer sufficiently to reduce the glass transition temperature of the swollen structure to a temperature just below the operating temperature, asymmetric polyxylylene oxide membranes embodying grafted elastomeric materials have been produced having a thin, dense nonporous layer on one major surface, which membranes display increased tolerance for folding and creasing of the membrane. Although measurement of mechanical properties in such thin (a few mils in thickness) films is not feasible, increased tolerance for folding and creasing in bulk material is indicative of a decrease in elastic modulus.

If no breach of the dense surface layer occurs, when the membrane has been folded and creased by firm pressure applied by thumb and first finger followed by a second crease similarly imposed by hand (the second crease intersecting and crossing the first crease at about right angles thereto) it is concluded that a reduction in apparent elastic modulus has occurred.

The membranes produced in each of the following examples were tested for soundness (freedom from pinholes) as follows. The permeabilities of each membrane to oxygen and to nitrogen were determined. Each membrane was mounted in an apparatus in which chambers located to each side of the membrane were evacuated to about 20–40 microns of mercury. Then, pure $O_2$ at a pressure of about 760 mm. of mercury was admitted to one side of the membrane. The volume of oxygen passing through the membrane after a given period of time was measured. The evacuation step followed by a similar evaluation for pure nitrogen followed. These volumes per unit time are the permeability values for oxygen ($P_{O_2}$) and nitrogen ($P_{N_2}$), respectively. Once these permeabilities were known it was possible to determine the separation factor for the given membrane relative to oxygen and nitrogen. The separation factor is equal to the ratio of $P_{O_2}$ to $P_{N_2}$. The theoretical value of the separation factor has a value of approximately 5. Thus, for any given membrane, the closer $P_{O_2}/P_{N_2}$ approaches a value of 5, the closer the gas membrane is to perfection. On the other hand a value for $P_{O_2}/P_{N_2}$ of unity shows complete breach (e.g. by a pinhole).

In each example given below the grafted elastomeric particles in the HIPS addition was in the form of a colloid (elastomeric particles 1 to 2 microns in diameter to which polystyrene chains had been grafted). In the typical commercial rubber modified polystyrene used hereinbelow the rubber is polybutadiene or butadiene-styrene copolymer.

EXAMPLE 1

A 50–50 wt. percent mixture of $[\eta]=.45$ and $[\eta]=1.0$ PPO was dissolved 8 wt. percent in a solvent consisting of 50 wt. percent chloroform and 50 wt. percent dichlorobenzene. A film cast from this solution after desolvating 30 sec., leaching and crystallizing in methanol, then drying, was 1.4 mils thick. The separation factor was determined to be 3.78, while the oxygen permeation rate was that equivalent to a 1.72 micron thickness of polyxylylene oxide. Thus, the thickness of the dense layer on the membrane was 1.72 microns.

EXAMPLE 2

A 50–50 wt. percent mixture of $[\eta]=.45$ and $[\eta]=1.0$ PO was augmented with about 3.5 wt. percent HIPS. About 8 wt. percent of this polymer mixture was dissolved in a solvent consisting of 50 wt. percent chloroform and 50 wt. percent dichlorobenzene. A film cast from this solution after desolvation 30 sec., leaching and crystallizing in methanol, then drying was 1.35 mils thick. The separation factor was 2.86 and an equivalent thickness of 2.05 microns of polyxylylene oxide was established.

EXAMPLE 3

This was an exact repetition of the second example except that 7 wt. percent of the polymer was HIPS. The separation factor was 4.37, dry film thickness was 1.2 mils, and the equivalent thickness 2.01 microns of polyxylylene oxide.

EXAMPLE 4

This was an exact repetition of the second example except that 14 wt. percent of the polymer was HIPS. Dry film thickness was 1.35 mils. Separation factor was was 4.21 and the equivalent thickness was 2.13 microns of polyxylylene oxide.

EXAMPLE 5

This was an exact repetition of the second example except that 21 wt. percent of the polymer was HIPS. Dry film thickness was 1.35 mils. Sseparation factor was found to be 4.61 and the equivalent thickness was 2.09 microns of polyxylylene oxide.

EXAMPLE 6

The film of Example 1 was creased by folding and pressing the folded region firmly between the thumb and first finger. A second fold and crease were created in a similar manner at about right angles to the first. The film split in two pieces during the second creasing.

EXAMPLE 7

This was an exact repetition of Example 2 except that 10 wt. percent of the polymer was HIPS. Dry thickness of the film was 1.2 mils. Before permeation testing the test sample was folding and creased by firm pressure between thumb and first finger as described in Example 6. A second crease was similarly created by hand intersecting crossing, and about at right angles to the first crease. The area in which the creases crossed each other was centrally disposed in the test chamber. Oxygen and nitrogen gases were permeated through the sample as in the previous examples. The separation factor was measured to be 4.51 and the equivalent thickness was 1.97 microns polyxylylene oxide.

The very marked improvement in the toughness of the asymmetric membrane was unexpected primarily because the effect was produced with a relatively small amount of the grafted elastomeric additive. Also, there was basis upon which to predict that the elastomeric additive would interfere with the crystallization of the asymmetric membrane. Further, the diameters of the elastomeric particles are of the magnitude of the thickness of the dense surface layer itself, which has been toughened against cracking. Thus, it is obvious that the effect created by the elastomeric particle addition is more than a bulk effect. That is, the dense surface layer is affected by elastomeric particles that cannot be completely contained therein.

What we claim as new and desire to secure by Letters Patent of the United States is:

1. A dry polymer membrane having a porosity increasing progressively from adjacent one major surface of the membrane to the second major surface thereof, the porosity being due to the presence of branch-like networks of pores extending through a mass of polymer crystals interconnected in a rigid network, said pores being microporous and interconnected, the polymer material for the membrane being selected from the group consisting of polyarylene oxide, polycarbonate, polyvinyl acetate, polyalkyl methacrylate, polysulfone and polymers of monovinyl aromatic hydrocarbons, said membrane containing a quantity of grafted elastomeric material distributed therein, the elastomeric material being in a state insoluble in said polymer material and the grafting material being soluble in said polymer material, said grafted elastomeric material being present as particles in the size range of from about 0.1 micron to about 10 microns and present in a quantity in the range of from about 1 to about 25 percent by weight of the weight of said polymer material.

2. The polymer membrane as recited in claim 1 in which only the one major surface adjacent the region of lesser porosity is a thin, dense, non-porous layer formed integral with and supported by the porous portion of said membrane, said layer and said porous portion consisting of the same polymer material.

3. The polymer membrane as recited in claim 1 wherein the polymer material is polyxylylene oxide and the grafted elastomeric material is polybutadiene rubber with polystyrene grafted thereto.

4. The polymer membrane as recited in claim 3 wherein the one major surface adjacent the region of lesser porosity is a thin, non-porous dense layer of polyxylylene oxide formed integral with the adjacent porous polyxylylene oxide.

5. The polymer membrane as recited in claim 2 wherein the maximum thickness of the dense layer is about 10 microns.

References Cited

UNITED STATES PATENTS

| | | | |
|---|---|---|---|
| 3,536,638 | 10/1970 | Dosmann | 117—135.5 |
| 3,540,916 | 11/1970 | Fukada | 117—135.5 |
| 3,671,375 | 6/1972 | Van Buskirk | 161—Dig. 2 |
| 3,709,774 | 1/1973 | Kimura | 161—159 |
| 3,718,532 | 2/1973 | Hayes | 161—Dig. 2 |

WILLIAM J. VAN BALEN, Primary Examiner

U.S. Cl. X.R.

161—Dig. 2